(12) United States Patent
Gusarov et al.

(10) Patent No.: US 8,910,283 B1
(45) Date of Patent: Dec. 9, 2014

(54) FIRMWARE-LEVEL SECURITY AGENT SUPPORTING OPERATING SYSTEM-LEVEL SECURITY IN COMPUTER SYSTEM

(71) Applicant: Kaspersky Lab ZAO, Moscow (RU)

(72) Inventors: Igor A. Gusarov, Moscow (RU); Yury V. Nesmachny, Moscow (RU); Sergey V. Dobrovolsky, Moscow (RU); Ilya B. Godunov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/086,574

(22) Filed: Nov. 21, 2013

(51) Int. Cl.
*G06F 21/00* (2013.01)
*G06F 21/57* (2013.01)

(52) U.S. Cl.
CPC .................................. *G06F 21/57* (2013.01)
USPC ............................................................ 726/22

(58) Field of Classification Search
CPC ......... G06F 21/50; G06F 21/51; G06F 21/57; G06F 21/575; G06F 21/577
USPC .......................... 726/25, 22, 24; 713/187, 188
See application file for complete search history.

(56) References Cited

U.S. PATENT DOCUMENTS

| | | | |
|---|---|---|---|
| 7,877,809 B1 | 1/2011 | Sutton et al. | |
| 8,037,290 B1 | 10/2011 | Stutton | |
| 8,104,088 B2 | 1/2012 | Khilnani et al. | |
| 8,428,929 B2 | 4/2013 | Sakthikumar et al. | |
| 2004/0236960 A1 | 11/2004 | Zimmer et al. | |
| 2009/0172381 A1 | 7/2009 | Zimmer et al. | |
| 2010/0153696 A1* | 6/2010 | Beachem et al. | 713/2 |
| 2010/0169967 A1 | 7/2010 | Khosravi et al. | |
| 2011/0214186 A1 | 9/2011 | Khilnani et al. | |
| 2012/0036308 A1 | 2/2012 | Swanson et al. | |
| 2012/0255021 A1 | 10/2012 | Sallam | |
| 2013/0276113 A1* | 10/2013 | Dalcher et al. | 726/23 |

FOREIGN PATENT DOCUMENTS

| | | |
|---|---|---|
| CN | 102279914 | 12/2011 |
| WO | WO2013064799 | 5/2013 |

OTHER PUBLICATIONS

Sinofsky, "Protecting the Pre-OS Environment with UEFI", Building Windows 8: An Inside Look from the Windows Engineering Team. 4 pages. Sep. 22, 2011. http://www.blogs.msdn.com/b/b8/archive/2011/09/22/protecting-the-pre-os-environment-with-uefi.aspx.
Grimes, "Ultimate PC security requires UEFI—and Windows 8 or Linux", InfoWorld. 2 pages. Mar. 26, 2013.
Kaspersky News Release, "Kaspersky Lab Presents World's First Anti-Malware Product for UEFI", 2 pages. Apr. 16, 2013.
Messmer, "New BIOS Security Standards Aimed at Fighting Rootkit Attacks", Networkworld. 2 pages. Aug. 22, 2012. http://www.networkworld.com/news/2012/082212-bios-261856.html.
European Search Report for European Application No. EP14159063 dated Jul. 23, 2014.

* cited by examiner

*Primary Examiner* — Edward Zee
(74) *Attorney, Agent, or Firm* — Patterson Thuente Pedersen, PA (57) ABSTRACT

A pre-OS security agent runs in an environment independent of the operating system (OS) but interfaced with the file system and able to exchange information with a security application running over the OS. Prior to the start-up of the OS, an indication of a state or condition is obtained relating to a risk of an inability of the security application to function normally, or to a change in the computer system affecting the start-up of the OS. Based on the indication, a set of one or more actions are determined for resolving the state or condition. The pre-OS security agent executes the set of one or more actions in response to the indication.

23 Claims, 10 Drawing Sheets

| Actions / Conditions | Integrity check for OS | Integrity check for security app | Malware scan/ removal | Repair OS | Check for firmware update | Check for security app update | Restore OS (system restore) | Restore security app |
|---|---|---|---|---|---|---|---|---|
| Failure to boot OS (discerned from OS boot log) | | | | | | | X | |
| OS crash (discerned from memory dump) | X | | | X | | | X | |
| Failure to launch/ crash of security application (discerned from security app operations log) | | X | X | | X | X | | X |
| Security application detected system change affecting boot process | X | X | X | X | | X | | |
| Security application received update pertaining to rootkit/ bootkit threats | X | X | X | | | | | |
| Failure of integrity check | | | X | | | X | | X |
| Lack of security app update | | X | X | | | X | | X |
| No event | X | | | | | | | |

*FIG. 10*

FIRMWARE-LEVEL SECURITY AGENT SUPPORTING OPERATING SYSTEM-LEVEL SECURITY IN COMPUTER SYSTEM

FIELD OF THE INVENTION

The invention relates generally to information processing and communications technologies and, more particularly, to a security arrangement for a computer system that operates independently of the operating system and supports the operating system-level security application.

BACKGROUND OF THE INVENTION

Security threats affecting personal computer systems present an ever-expanding set of challenges. Although computer malware, such as worms, trojans and viruses, have been evolving since the time before the ubiquity of personal computers, the last decade has seen a particularly significant expansion in the variety, sophistication and deployment of malware.

Notably, one recent trend is the evolution of malware creators from mostly nuisance players, to organized criminal organizations that deploy malware for financial gain. Some examples include stealing bank accounts, credit card databases, personal identity information, trade secret information, or the like. Certain malicious programs, known as ransomware, have been used to purposely interfere with the normal operation of a user's computer system while demanding that a ransom be paid, or supposed security software be purchased, to restore the normal operation.

There is an ongoing arms race being waged between malware creators and legitimate computer security companies. As security applications have evolved to keep pace with malware developments, so too have malware tools designed for overcoming the various protection techniques. Present-day malware programs oftentimes try to modify the kernel or the boot process of the operating system to obfuscate their existence in the computer system. These so-called rootkits or bootkits can be particularly difficult to counteract since security programs such as antivirus tools are application-level programs that run on top of the operating system and rely on the operating system's drivers, libraries, and other services, which may be compromised.

Recent advances in personal computer firmware, such as those advanced by the Unified Extensible Firmware Interface (UEFI) Forum, provide a secure program execution environment that operates independently of the operating system while providing a platform from which to run applications that utilize networking and other input/output facilities of the computer system. Various security-related solutions utilizing this type of advanced pre-OS firmware have been proposed, including ensuring the integrity of installed operating system and other program code, and providing updates and failure recovery for the operating system and certain applications prior to operating system startup.

Although these advances certainly provide improvements in computer system security, particularly in protecting against attacks that seek to bypass the conventional security application programs, there are nonetheless practical limits in the extent of pre-OS bootup security functionality that can be provided. For instance, users will tend to become frustrated if the pre-OS bootup security functionality causes significant slowdown in the system startup.

There is a need for effective, yet efficient, security measures for pre-OS security services without unduly burdening the resources and time needed for operating system startup.

SUMMARY OF THE INVENTION

One aspect of the invention is directed to a pre-OS agent in a computer system. The computer system has a set of computing hardware including processing devices, and a data storage device. The computer system further includes an operating system (OS) executable on the computing hardware, and a security application executable on the computing hardware and operable dependent on the OS. The pre-OS agent facilitates system security prior to start-up of the OS.

The pre-OS security agent is operable independent of the OS. It obtains an indication of a state or condition relating to the computer system associated with a risk of an inability of the security application to function normally, or a change in the computer system affecting the start-up of the OS. Based on the indication, the pre-OS security agent determines a set of at least one action to resolve the state or condition, and executes the set of at least one action only in response to the indication. Advantageously, by limiting the action in this manner, system startup time is greatly reduced relative to systems that carry out such actions as a matter of course. At the same time, the protection of the computer system against threats such as bootkits and rootkits, remains effective, taking advantage of the pre-OS environment in which to address the threats.

Another aspect of the invention is directed to a system for protecting a computer system. The system includes a set of instructions executable by computing hardware and stored in a non-transitory storage medium that, when executed, cause the computing hardware to implement a pre-OS security agent operable independent of the OS. The pre-OS security agent includes a communication module configured to access a remote computer system via the network interface device. An antivirus module is configured to perform malware scanning and removal at the pre-OS level. An interface module is configured to facilitate exchange of data between the pre-OS security agent, and the security application and file system of the computer system. An action coordinator module is configured to detect an indication of a state or condition relating to the computer system associated with a risk of an inability of the security application to function normally, or a change in the computer system affecting the start-up of the OS. The action coordinator module is further configured determine and execute a set of at least one action to resolve the state or condition in response to the indication.

A number of other advantages will become apparent from the following detailed description of the preferred embodiments of the invention.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE PREFERRED EMBODIMENTS

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines (e.g., system virtual machines, operating system-level virtual machines, process virtual machines, or any combination thereof) that in turn are executed on one or more physical machines. It will be understood by persons of skill in the art that features of the invention may be realized by a variety of different suitable machine implementations.

Figure 1:
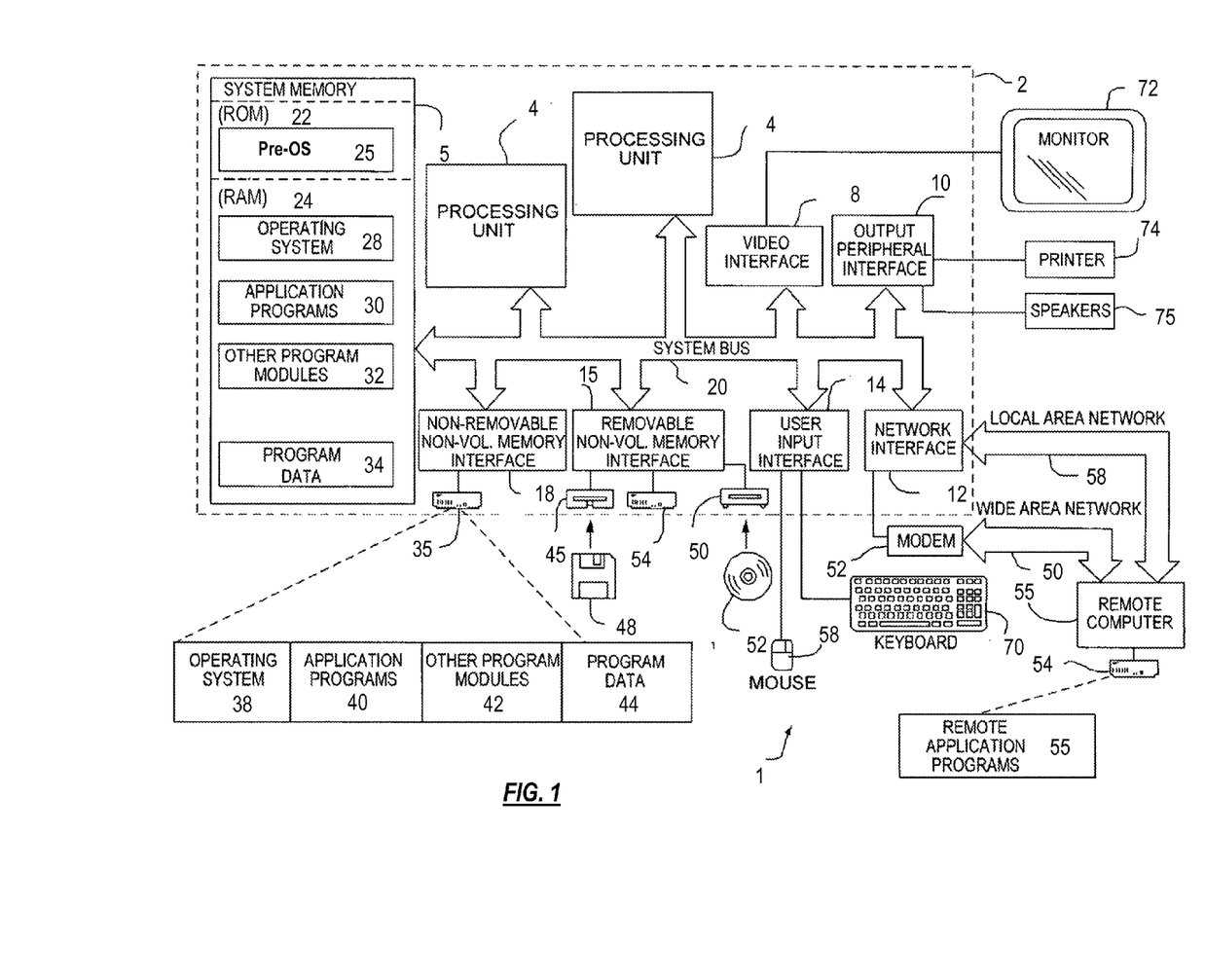
FIG. 1 is a block diagram illustrating an example of a general-purpose computer system on which aspects of the invention may be carried out.

FIG. 1 is a diagram illustrating a computer system 1 on which aspects of the invention as described herein may be implemented according to various embodiments. The computer system 1 may include a computing device such as a personal computer 2. The personal computer 2 includes one or more processing units 4, a system memory 6, a video interface 8, an output peripheral interface 10, a network interface 12, a user input interface 14, removable 16 and non-removable 18 memory interfaces and a system bus or high-speed communications channel 20 coupling the various components. In various embodiments, the processing units 4 may have multiple logical cores that are able to process information stored on computer readable media such as the system memory 6 or memory attached to the removable 16 and non-removable 18 memory interfaces 18. The computer 2 system memory 6 may include non-volatile memory such as Read Only Memory (ROM) 22 or volatile memory such as Random Access Memory (RAM) 24. The ROM 22 may include a pre-operating system environment 25 to help communicate with the other portion of the computer 2. The pre-operating system environment 25 can include basic input/output system (BIOS) functionality, as well as additional functionality such as specialized applications that may be executed without the operating system. The RAM 24 may store portions of various software applications such as the operating system 28, application programs 30 and other program modules 32. Further, the RAM 24 may store other information such as program or application data 34. In various embodiments, the RAM 24 stores information that requires low-latencies and efficient access, such as programs and data being manipulated or operated on. In various embodiments RAM 24 comprises Double Data Rate (DDR) memory, Error Correcting memory (ECC) or other memory technologies with varying latencies and configurations such as RAMBUS or DDR2 and DDR3. In this way, in various embodiments, the system memory 6 may store the input data store, access credential data store, operating memory data store, instruction set data store, analysis result data store and the operating memory data store. Further, in various embodiments, the processing units 4 may be configured to execute instructions that limit access to the aforementioned data stores by requiring access credential before access to the information is granted.

The removable 16 and non-removable 18 memory interfaces may couple the computer 2 to disk drives 36 such as SSD or rotational disk drives. These disk drives 36 may provide further storage for various software applications such as the operating system 38, application programs 40 and other program modules 42. Further, the disk drives 36 may store other information such as program or application data 44. In various embodiments, the disk drives 36 store information that doesn't require the same low-latencies as in other storage mediums. Further, the operating system 38, application program 40 data, program modules 42 and program or application data 44 may be the same information as that stored in the RAM 24 in various embodiments mentioned above or it may be different data potentially derivative of the RAM 24 stored data.

Further, the removable non-volatile memory interface 16 may couple the computer 2 to magnetic portable disk drives 46 that utilize magnetic media such as the floppy disk 48, Iomega® Zip or Jazz, or optical disk drives 50 that utilize optical media 52 for storage of computer readable-media such as Blu-Ray®, DVD-R/RW, CD-R/RW and other similar formats. Still other embodiments utilize SSD or rotational disks housed in portable enclosures to increase the capacity of removable memory.

The computer 2 may utilize the network interface 12 to communicate with one or more remote computers 56 over a local area network (LAN) 58 or a wide area network (WAN) 60. The network interface 12 may utilize a Network Interface Card (NIC) or other interface such as a modem 62 to enable communication. The modem 62 may enable communication over telephone lines, coaxial, fiber optic, powerline, or wirelessly. The remote computer 56 may contain a similar hardware and software configuration or may have a memory 64 that contains remote application programs 66 that may provide additional computer readable instructions to the computer 2. In various embodiments, the remote computer memory 64 can be utilized to store information such as identified file information that may be later downloaded to local system memory 6. Further, in various embodiments the remote computer 56 may be an application server, an administrative server, client computers, or a network appliance.

A user may enter information to the computer 2 using input devices connected to the user input interface 14 such as a mouse 68 and keyboard 70. Additionally, the input device may be a trackpad, fingerprint scanner, joystick, barcode scanner, media scanner or the like. The video interface 8 may provide visual information to a display such as a monitor 72. The video interface 8 may be an embedded interface or it may be a discrete interface. Further, the computer may utilize a plurality of video interfaces 8, network interfaces 12 and removable 16 and non-removable 18 interfaces in order to increase the flexibility in operation of the computer 2. Further, various embodiments utilize several monitors 72 and several video interfaces 8 to vary the performance and capabilities of the computer 2. Other computer interfaces may be included in computer 2 such as the output peripheral interface 10. This interface may be coupled to a printer 74 or speakers 76 or other peripherals to provide additional functionality to the computer 2.

Various alternative configurations and implementations of the computer are also contemplated. These variations may include, without limitation, additional interfaces coupled to the system bus 20 such as universal serial bus (USB), printer port, game port, PCI bus, PCI Express or integrations of the various components described above into chipset components such as the northbridge or southbridge. For example, in various embodiments, the processing unit 4 may include an embedded memory controller (not shown) to enable more efficient transfer of data from the system memory 6 than the system bus 20 may provide.

Figure 2:
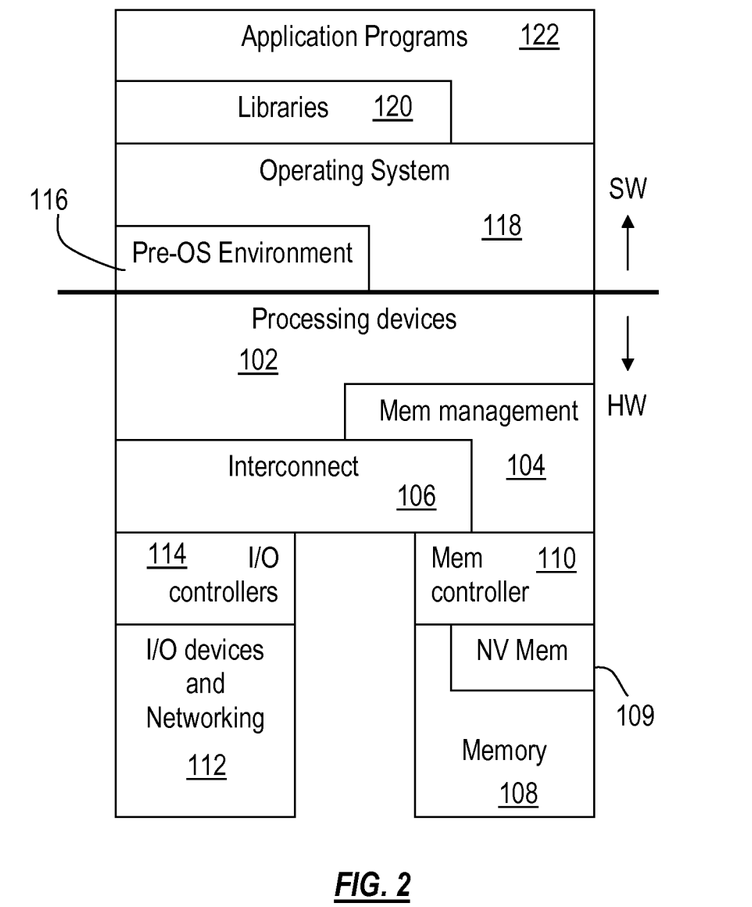
FIG. 2 is a diagram illustrating a typical hardware and software architecture of a computer system such as the one depicted in FIG. 1, in which various interfaces between hardware and software components are shown.

FIG. 2 is a diagram illustrating an exemplary hardware and software architecture of a computer system such as the one depicted in FIG. 1, in which various interfaces between hardware components and software components are shown. As indicated by HW, hardware components are represented below the divider line, whereas software components denoted by SW reside above the divider line. On the hardware side, processing devices 102 (which can include one or more microprocessors, digital signal processors, etc., each having one or more processor cores, are interfaced with memory management device 104 and system interconnect 106. Memory management device 104 provides mappings between virtual memory used by processes being executed, and the physical memory. Memory management device 104 can be an integral part of a central processing unit which also includes the processing devices 102.

Interconnect 106 includes the memory, data, and control busses, as well as the interface with peripherals, e.g., PCI, USB, etc. Memory 108 (e.g., dynamic random access memory—DRAM) and non-volatile memory 109 sush as flash memory (i.e., electrically-erasable read-only memory—EEPROM) are interfaced with memory management device 104 and interconnect 106 via memory controller 110. This architecture can support direct memory access (DMA) by peripherals. I/O devices, including video and audio adapters, disk storage, external peripheral busses such as USB, Bluetooth, etc, as well as network interface devices such as those communicating via Ethernet or Wi-Fi interfaces, are collectively represented as I/O devices and networking 112, which interface with interconnect 106 via corresponding I/O controllers 114.

On the software side, a pre-operating system (pre-OS) environment 116, which is executed at initial system start-up and is responsible for initiating the boot-up of the operating system. One traditional example of pre-OS environment 116 is a system basic input/output system (BIOS). In present-day systems, a unified extensible firmware interface (UEFI) is implemented. Pre-OS environment 116, described in greater detail below, is responsible for initiating the launching of the operating system, but also provides an execution environment for embedded applications according to certain aspects of the invention. Operating system 118 provides a kernel that controls the hardware devices, manages memory access for programs in memory, coordinates tasks and facilitates multitasking, organizes data to be stored, assigns memory space and other resources, loads program binary code into memory, initiates execution of the application program which then interacts with the user and with hardware devices, and detects and responds to various defined interrupts. Also, operating system 118 provides device drivers, and a variety of common services such as those that facilitate interfacing with peripherals and networking, that provide abstraction for application programs so that the applications do not need to be responsible for handling the details of such common operations. Operating system 118 additionally provides a graphical user interface (GUI) that facilitates interaction with the user via peripheral devices such as a monitor, keyboard, mouse, microphone, video camera, touchscreen, and the like.

Libraries 120 include collections of program functions that provide further abstraction for application programs. These include shared libraries, dynamic linked libraries (DLLs), for example. Libraries 120 can be integral to the operating system 118, or may be added-on features, or even remotely-hosted. Libraries 120 define an application program interface (API) through which a variety of function calls can be made by application programs to invoke the services provided by the operating system 118. Application programs 122 are those programs that perform useful tasks for users, beyond the tasks performed by lower-level system programs that coordinate the basis operability of the computer system itself.

Figure 3:
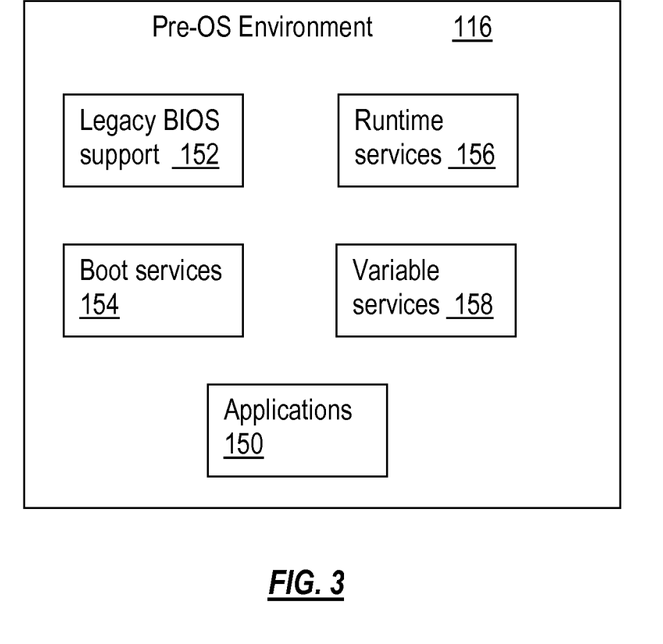
FIG. 3 is a block diagram illustrating examples of services provided in a pre-operating system environment, in which certain aspects of the invention can be implemented.

FIG. 3 is a block diagram illustrating examples of services provided in pre-OS environment 116, in which certain aspects of the invention can be implemented. Pre-OS environment 116, as mentioned above, facilitates execution of embedded applications without operating system 118. The applications that can run according to pre-OS environment 116 have access to certain device drivers and peripherals of the computer system. In one sense, pre-OS environment 116 includes a lightweight, or minimal, operating system in its own right, except that this operating system is substantially limited in its capacity to support full-featured services, libraries, and application programming interfaces (APIs). Pre-OS environment 116 can be stored on the primary disk drive or designated boot device, or it may be embedded in a ROM device such as a flash EEPROM on the computer system's motherboard. As mentioned above, an example of a pre-OS environment 116 is the unified extensible firmware interface (UEFI), though other implementations of pre-OS environment 116, either known or arising in the future, of are contemplated.

Various functional blocks realized using computer systems or other electronic hardware can be described in terms of modules, each of which is constructed, configured, or otherwise adapted, to carry out a function or set of functions. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers (e.g., cluster nodes) that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out. In addition, a module can itself be composed of more than one sub-modules, each of which can be regarded as a module in its own right. Moreover, in the embodiments described herein, each of the various modules corresponds to a defined functionality; however, it should be understood that in other contemplated embodiments, each functionality may be distributed to more than one module. Likewise, in other contemplated embodiments, multiple defined functionalities may be implemented by a single module that performs those multiple functions, possibly alongside other functions, or distributed differently among a set of modules than specifically illustrated in the examples herein.

Accordingly, the services provided by pre-OS environment 116 are Legacy BIOS support module 152 includes program code of functions that emulate a traditional BIOS environment to support older operating systems that are incompatible with any other pre-OS environment. Boot services module 154 includes text and graphical consoles on various devices, and bus, block and file services. Also, boot services module 154 includes a firmware policy engine that is in charge of loading the operating system loader program and all necessary drivers. The boot configuration is controlled by a set of global variables, including boot variables that indicate the paths to the loaders. Runtime services module 156 provides functions that are accessible while the operating system is running. These functions include services such as date, time and NVRAM access. Variable services module 158 provides a way to store data, e.g., non-volatile data, that is shared between platform firmware and operating systems or pre-OS environment applications.

Applications module 150 provides the services needed for applications to be executed in pre-OS environment, including device drivers, a shell program, and instructions for initiating pre-OS applications, and the applications themselves.

Among the applications supported by applications module 150, a pre-OS security agent 200 is provided according to one aspect of the invention. In various embodiments, pre-OS agent security agent 200 effects changes in one or more application programs 122 that run above the operating system 118. These changes can include changes to the program code of the application programs 122, to configuration settings of the applications 122, or to data utilized by the applications 122. In a related type of embodiment, pre-OS security agent 200 effects changes in the operating system 118 itself. The ability of pre-OS security agent 200 to effect such changes prior to the boot-up of the operating system ensures that malware that might otherwise interfere with the making of the changes, is entirely preempted.

Figure 4:
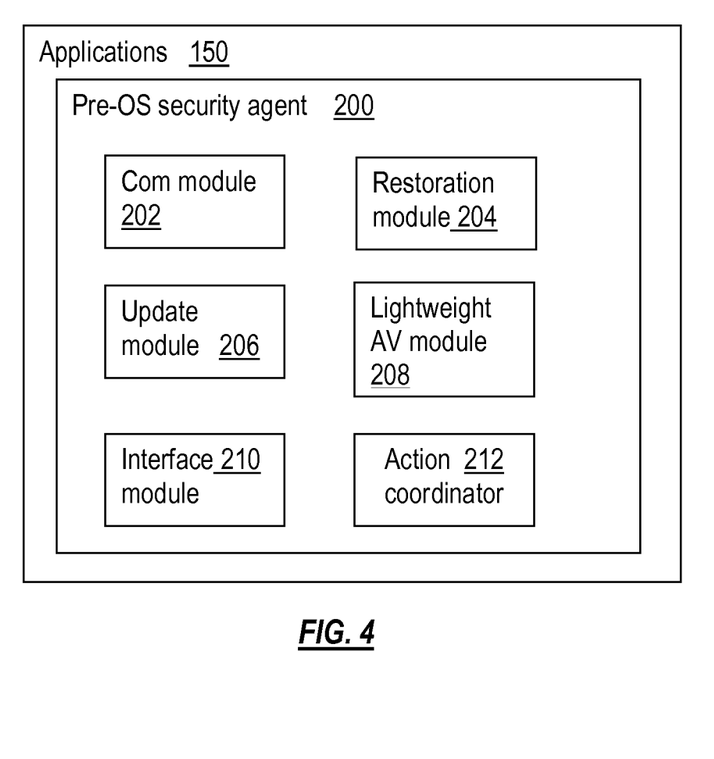
FIG. 4 is a block diagram illustrating various modules that make up a pre-OS security agent according to one embodiment of the invention.

Some of the modules that make up pre-OS security agent 200 according to one embodiment are illustrated in FIG. 4. Communication module 202 utilizes the computer system's network interface and suitable device drivers to connect to a remote computer system such as a security services server. Restoration module 204 is configured to restore application programs to a default or earlier state, such as a backup or restore point. This operation can roll-back updates and return the target application to an earlier version. The restore point can be obtained from a secure location on the local computer system, from a removable medium such as a flash drive, or from a remote computer system (e.g., a security server or a server operated by the creator or distributor of the application program) via communication module 202. Similarly, in a related embodiment restoration module 204 can restore parts, or all, of the operating system 118 according to one or more predefined system restore points using either the operating system's own "system restore" archive, or a separate, secured, archive stored in a different location, either locally or remotely.

Accordingly, in one such embodiment, restoration module 204 includes instructions that define where to obtain restoration information for restoring application programs or the operating system which are supported, as well as an algorithm for determining which restore point to select according to a given set of circumstances, which are provided as inputs to the restore algorithm. For instance, this restore algorithm may define a series of locations of restore points to be selected in a defined order, where subsequent locations are used if a previous attempt resulted in a failure to restore the target application program or operating system component. In addition, the exemplary restore algorithm can save an indicator of the last successfully-executed version of each application program or operating system component, and include instructions for preferentially selecting that version in response to a call for restoration. In related embodiments, restoration module 204 includes instructions for restoring pre-OS security agent 200. In one embodiment, restoration is called for when there is a detected compromise or corruption of the operating system or application program 122, particularly if the application program is a security application. In this case, a compromised OS or security application may not be trusted to properly restore itself. This situation may be caused by some unrecoverable fault, or by a rootkit/bootkit type of malware that has taken over the operating system's kernel.

Update module 206 performs updates of the application programs 122, of the operating system 118, or of pre-OS security agent 200, as the case may be. Update module 206 can receive program or database updates via communication module 202, which may be provided by an update server operated by the security services provider or another authorized provider, such as the operating system or application program manufacturer or distributor. In one type of embodiment, the updates performed by update module 206 are not as comprehensive as updates normally received directly by the application programs 122. Rather, the updates according to this embodiment are narrowly-tailored to address a particularly critical problem or situation that is deemed to require updates from a pre-OS operating state of the computer system. One example of such a situation, in the case of the application program 122 being a security application, is in response to a notification of a new malware database update that includes new rootkit or bootkit definitions. Since this type of malware poses the risk of compromising the operating system's kernel, handling the update at the pre-OS state ensures that the update is completed properly, even if the operating system is already compromised.

Lightweight antivirus (AV) module 208 is configured to to carry out certain limited functionality of scanning and detecting malware based on malware definitions that are locally and securely stored, and updated. In a related embodiment, lightweight AV module 208 is configured to remove or quarantine malware programs and to clean files, application program code, and operating system components to some extent. In an exemplary approach, lightweight AV module 208 is designed to take the most essential measures that are needed to protect the operating system 118 and the security application from among application programs 122, so that the security application can be relied upon (together with the operating system's kernel, services, libraries, etc.) to protect the computer system with its full functionality.

Interface module 210 includes instructions and security provisions for securely interfacing with the operating system, the file system, and applications 122. In one embodiment, interface module 210 is configured to access the disk drive(s) of the computer system and read from, and write to, the directory, file control blocks, etc., so that specific files can be located, and accessed. In a realted embodiment, a specialized, secure buffer is accessed by interface module 210, through which data, instructions, and any other information, can be conveyed between pre-OS security agent 200, and an application from among application programs 122, that is also configured to access the same secure buffer. Cryptographic techniques may be employed to obfuscate the contents, and even the existence, of the secure buffer, according to one embodiment. In one embodiment, interface module 210 facilitates a one-directional flow of information, namely, from pre-OS security agent 200, to the corresponding application. In another approach, the application is provisioned to communicate information to pre-OS security agent 200, and agent 200 is suitably configured to obtain that information while the computer system is in a pre-OS state.

Action coordinator module 212 is responsible for controlling the operation of pre-OS security agent 200. As will be described in greater detail below, action coordinator module 212 monitors the computer system for various conditions, or states, applies decision logic based on a set of ddecision criteria to determine actions to take in response to certain states or conditions, and commands various functions to be carried out according to each determined response. Accordingly, action coordinator module 212 ties together the various modules of pre-OS security agent 200 into a single, cohesive, functional unit.

Figure 5:
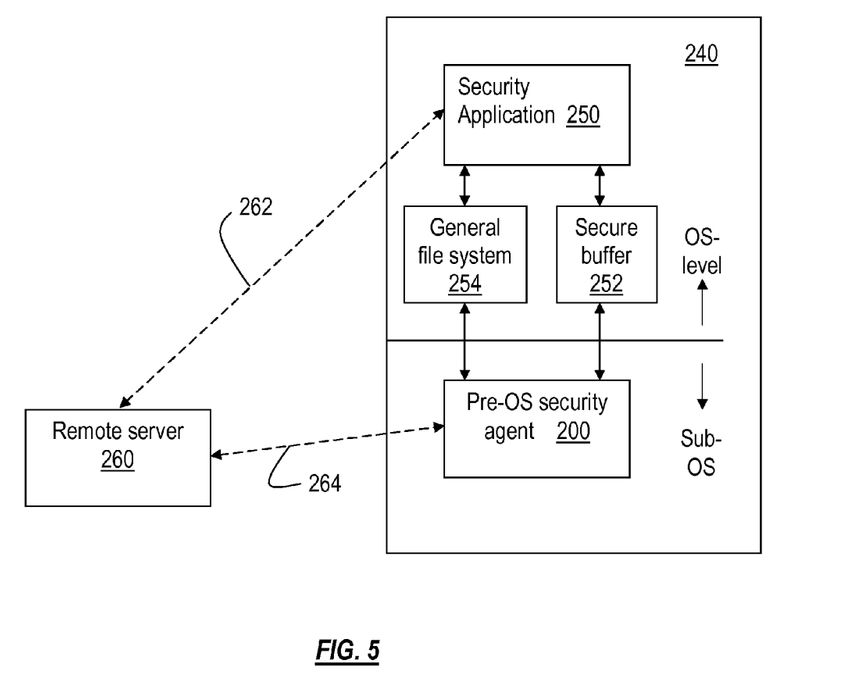
FIG. 5 is a functional block diagram illustrating communicative interaction between a pre-OS security agent and a security application operating on a local computer system, as well as between these modules and a remote server, according to one embodiment of the invention.

FIG. 5 is a functional diagram illustrating communicative interaction between pre-OS security agent 200 and a security application 250 operating on a local computer system 240, as well as between these modules and a remote server 260, according to one embodiment. Security application 250 in this example is an application program from among application programs 122, which runs on top of the operating system 118 (at the OS-level) and provides a suite of security-related functions. Remote server 260 represents a security server operated by a licensor of the security application program. Remote server 260 provides regular updates to security application 250. Communication link 262 represents a typical communication established over a network connection between security application 250 and remote server 260, over which the updates are provided. A number of other functions can be supported by remote server 260, such as certain distributed processing, user-community data collection, proxy services, etc. The updates and other services are provided while security application 250 is running.

Pre-OS security agent 200 runs below the operating system (sub-OS) and also communicates with remote server 260, only this communication is facilitated by a different communication link, 264. Communication link 264 is established prior to start-up of the operating system and security application 250. Updates or other instructions may be provided via communication link 264. As discussed above, these updates can include updates to pre-OS security agent 200, security application 250 and, in some embodiments, updates to the operating system or other application programs.

Pre-OS security agent 200 accesses secure buffer 252, and general file system 254 via interface module 210. Secure buffer 252, in one embodiment, can be implemented as a file in the file system or, alternatively, it can be implemented as a component of the operating system, such as the operating system's registry. In another embodiment, secure buffer 252 can be implemented as a dedicated portion of the disk drive that is specifically not made available for use to the general file system. In another embodiment, secure buffer 252 is implemented using non-volatile memory available on the motherboard of the computer system, such as the memory used to store the instructions and data for the pre-OS environment 116. In these embodiments, information is written by pre-OS security agent 200, or security application 250, to secure buffer 252, and read, respectively by security application 250 or pre-OS security agent 200, as the case may be. In a related embodiment, a specialized sub-OS level device driver is provided for use by pre-OS security agent 200 to access secure buffer 252. Likewise, an OS-level device driver is provided for exclusive use by security application 250 to access secure buffer 252. In one such embodiment, the OS-level device driver authenticates security application 250 before it can provide access to secure buffer 252. In a related embodiment, security application authenticates the device driver in similar fashion as a prerequisite to using the device driver to access secure buffer 252. In another related approach, security application 250 and pre-OS security agent 200 each use a public key infrastructure (PLI) system to digitally sign (i.e., encrypt) the data to be written to the secure buffer 252 using the public key of the other. When reading data saved in secure buffer 252, security application 250 and pre-OS security agent 200 each uses its private key to decrypt the data.

Figure 6:
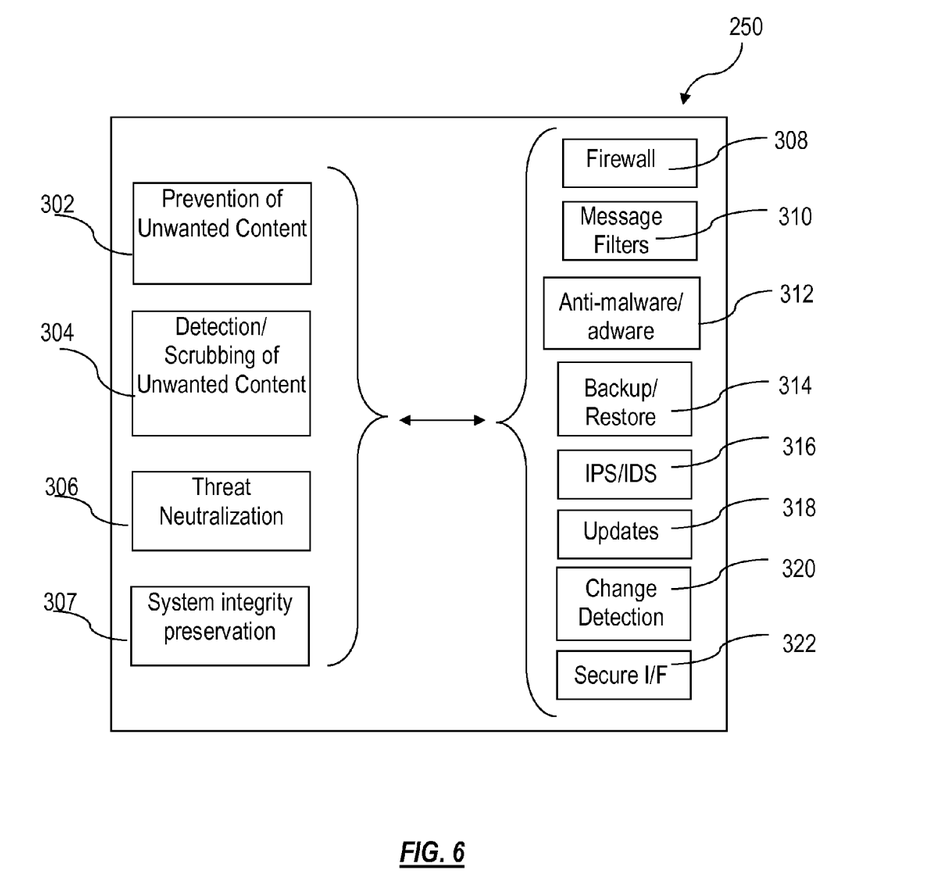
FIG. 6 is a diagram illustrating various classes of functionality along with exemplary modules that are implemented as part of a security application according to one embodiment.

FIG. 6 is a diagram illustrating security application 250 in greater detail. Security application 250 performs any combination of one or more security-related functions, such as prevention of unwanted content 302, detection/scrubbing of unwanted content 304, threat neutralization 306, and system integrity preservation 307. These security-related functions are described below only generally, by way of illustration, and are not intended to be a required or exhaustive list of security functions that are contemplated. A variety of other security-related functions can be present in addition to, or in place of, any of the functions exemplified herein. Likewise, local security application 250 may comprise fewer functions than described in this example.

Prevention of unwanted content 302 includes blocking unwanted content, such as viruses, worms, and other malware, adware, spyware, spam, and the like, as well as undesired data traffic, such as hacker attacks, before any of these threats or programs can be placed on the local device. Typically, this function involves blocking or diverting of content or data traffic at a firewall. Detection/scrubbing of unwanted content 304 would apply to content that may have penetrated the prevention function, and now resides in some form on the local device. A typical example of this functionality would include scanning for viruses based on a database of virus definitions, and removing or quarantining those program instructions or associated data. Threat neutralization 306 applies to detected unwanted content or detected attacks or threats in progress, and involves taking action to terminate any suspect programs or processes, stop network traffic, and restore the system to a previous known safe state. System integrity protection 307 relates to ensuring that program instructions and essential data to the operation of the operating system or certain application programs is uncorrupted. Various techniques for accomplishing this objective are contemplated, such as checksums, cryptographic algorithms (e.g., digital signatures, hashes, etc.).

Security application 250 in this example includes a variety of components, such as, for example, firewall 308, message filters 310, anti-malware/adware blocking/removal module 312, system backup/restore utility 314, and intrusion prevention or detection system (IPS/IDS) 316. Other components include update module 318, change detection module 320, and secure interface 322 that is configured to exchange data with pre-OS security agent 200. These components are implemented as modules, and can work in different combinations to achieve the various functions of security application 250.

In one embodiment, change detection module 320 is configured to monitor changes made to the computer system by the operating system and by other application programs 122. Of particular interest in this embodiment are changes that affect the boot process of the operating system. For example, the installation of new device drivers, the addition of new system services to be managed by the operating system, changes to the settings defining memory-resident programs to be loaded at startup, changes to certain operating system registry settings, etc. Also, change detection module 320 can independently detect changes to a whitelist or blacklist of programs used by anti-malware/adware blocking/removal module 312. In response to detection of any of these (or other monitored) changes, change detection module 320 makes a log entry, or sets a flag indicating the fact that such a monitored-for change was in fact detected. Optionally, additional information can be included, such as an indicator of the type of change. The log entry flag, or other indicators, are made with the assistance of secure interface 322, which is able to access secure buffer 252, in which to write the information.

Figure 7:
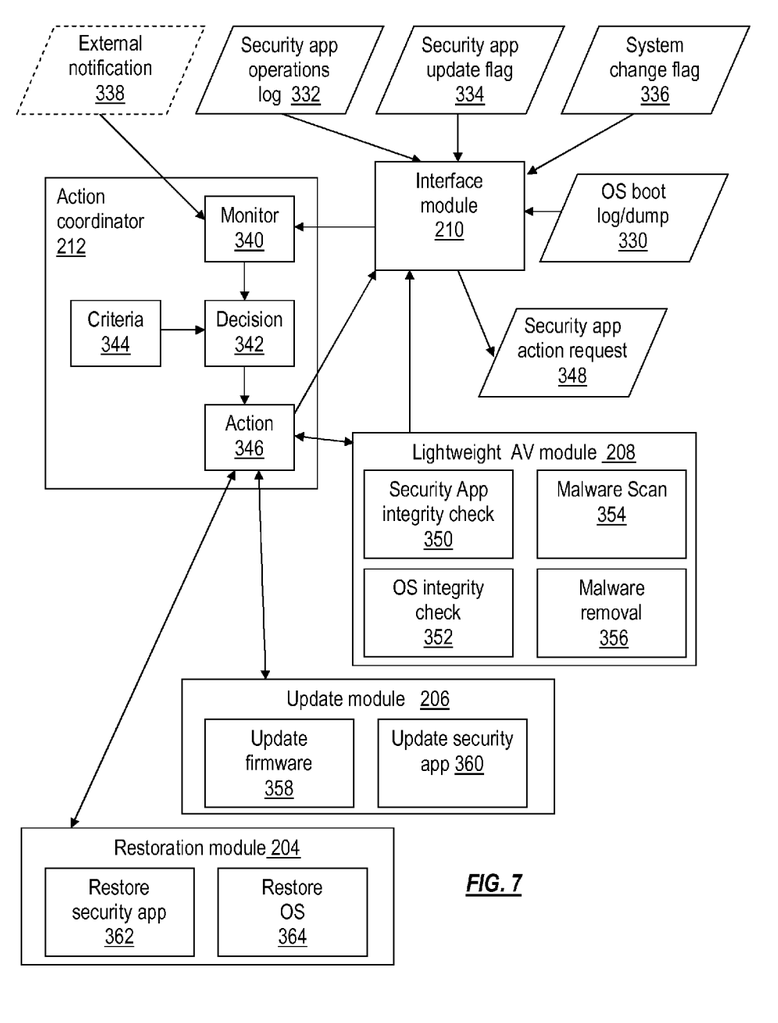
FIG. 7 is a structural block diagram illustrating various sub-modules of a pre-OS security agent, as well as information and decision flow associated with their operation, according to one embodiment.

FIG. 7 is a structural block diagram illustrating various sub-modules of pre-OS security agent 200, as well as information and decision flow associated with their operation, according to one embodiment. Action coordinator module 212 in this embodiment includes monitor module 340, decision module 342, criteria set 344, and action execution module 346. Monitor module 340 obtains information about the state or condition of the computer system. In the example depicted, this is accomplished via interface module 210, which accesses the general file system 254, which will include operating system logs, logs stored by certain applications, and secure buffer 252, which will contain information provided by change detection module 320 from security application 250. Such information as event logs 330 containing events or issues logged by the operating system during its last boot-up sequence, as well as events logged during operation of the operating system, plus any memory dumps that may have taken place due to a system crash, are obtained from the file system. A log 332 kept by security application 250 representing events occurring during its operations, may also be accessed by interface module 210. Other objects being monitored include an update flag 334 set by security application 250, and system change flag 336 set by change detection module 320 of security application 250. Another source of information collected by monitor module 340 is externally-supplied notifications, such as those provided by remote server 260 via communication module 202 (FIG. 4). It will be understood that these examples are by no means an exhaustive list of objects of interest that can be monitored in this fashion according to related embodiments of the invention. In a more general sense, monitor module 340 obtains some specific insights into critical events or conditions that the computer system has experienced, particular with regard to system security.

The information obtained by monitor module 340 is passed to decision module 342, which determines whether any action needs to be taken in response to the monitored information, and, if so, what actions to take. The decision is made based on decision criteria 344, and on decision logic with which decision module 342 is configured. The decision logic can be of any suitable form, including hard logical rules, fuzzy logic, artificial neural network, or the like, though in practical implementations a desire for compact instructions and fast, efficient computation may limit the decision system's architecture for certain embodiments. Once a decision is computed by decision module 342, action module 346 carries out the prescribed action.

Actions can include use of restoration module 204, update module 206, and lightweight antivirus module 208, or any combination thereof. For instance, in response to an external notification of an increased security threat level, or a system change flag being set, lightweight antivirus module 208 may be called upon to perform an integrity check of the security application 250, or of the operating system, each of which is handled, respectively, by security application integrity checking module 350, and operating system integrity checking module 352. In another example, in response to log entries indicative of changes affecting the system startup sequence, a malware scan may be provided by malware scan module 354. In one embodiment, the malware scan performed by malware scan module 354 is performed only on the files and registry settings associated with security application 250. In another embodiment, the malware scan is targeted to particular files and folders in the file system, or other objects, that are deemed most vulnerable or most critical, such as files loaded in the boot sequence of the operating system. Malware removal module 356 is tasked with quarantining or safely deleting any malware found as a result of the malware scan by module 354.

In another example embodiment, in response to a detected system change flag, update module 206 may be called upon to check for updates prior to boot-up of the operating system. Accordingly, firmware update module 358 can check with remote server 260 for any available updates for the pre-OS security agent 200, and if any such update is available, this module can complete the update. Likewise, security application update module 360 can check with remote server 260 for any updates of program code, or of the malware definitions database used by security application 250, and institute those updates if appropriate.

In a related embodiment, security application update module 360 includes a compact update routine, which obtains only particularly critical updates, such as only a subset of malware definitions or malware removal scripts. These subsets of the updates for the security application can include only features pertaining to rootkit/bootkit detection and removel, for instance. Using a compact upate routine, the time required during the pre-OS environment operation can be reduced, thereby facilitating faster computer system boot-up than would be the case if a more complete update were to be performed. In a related embodiment, security application update module 360 can set a flag in secure buffer 252 (via interface module 210) indicating that a partial update was performed, and that a complete update is necessary once the security application 250 is loaded.

In a related embodiment, in response to a detection of a crash or other critical failure, including a software conflict between the operating system and an application program such as security application 250, restoration module 204 may be called upon to restore portions, or all, of the security application 250, which is managed by security application restoration module 362. Likewise, depending on the nature of the problem detected, portions, or all, of the operating system may be restored using operating system restoration module 364. The restore point, or previous version of the security application 250 can be stored locally in the file system. In another embodiment, the previous version is obtained via download from remote server 260. It should be noted that various states, conditions, or notifications may require different combinations of actions to be taken, as defined per decision criteria 344.

In a related embodiment, security application operations log 332 is used by security application 250 to pass a request or instructions to action coordinator module 212. In one such example, there may be a situation in which security application 250 detects or suspects a malicious object, but is unable to delete or quarantine the object. This inability to resolve the malicious object may be due to the operation of a rootkit, for example, that prevents the security application from taking certain actions affecting the file system. In response, the security application 250 logs a request for pre-OS action in operations log 332, indicating the malicious object and requested action (e.g., removal, quarantine, etc.). In the next boot-up, action module 346 receives notification of the request for pre-OS action via monitor module 340 and decision module 342, and schedules the appropriate operation to be performed by lightweight antivirus module 208 (or any of the other modules, as appropriate). Following completion of the requested pre-OS action, action module 346 can report the result of the action (i.e., confirmation that it has been completed, or a failure message) via interface module 210. This feedback can be logged in security application operations log 332, or elsewhere in secure buffer 252.

In another related embodiment, lightweight antivirus module 208 makes use of the more feature-rich antivirus functionality of security application 250 to complete certain operations. According to this embodiment, lightweight antivirus module reports a need for a action to be taken by security application 250 to action module 346 which, in turn, forms a request for such action and forwards the same to interface module 210. In response to receiving this request, interface module 210 writes a security application action request 348 into a secure buffer 252 accessible by security application 250. In a similar approach, lightweight antivirtus module 208 can form the request for action and communicate the same to interface module 210 (bypassing action module 246). This approach may be used in a case where lightweight antivirus module 208 suspects a malicious object but lacks a heuristic analyzer needed to sufficiently assess the risk of the suspected object. Accordingly, the lightweight antivirus module 208 can quarantine the malicious object, and cause a security application action request 348, which identifies the quarantined object and requests its analysis to be performed, to be created. Secirity application 250 can, upon reading request 348, execute the requested action, and report the result of the action to lightweight antivirus module 208 via security application operations log 332.

Figure 8A:
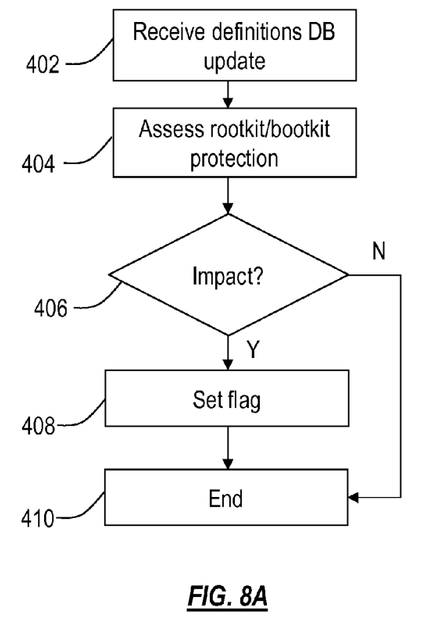
FIGS. 8A and 8B are flow diagrams illustrating certain operations performed by a security application and interaction between the security application and a pre-OS security agent, according to one embodiment of the invention.
Figure 8B:
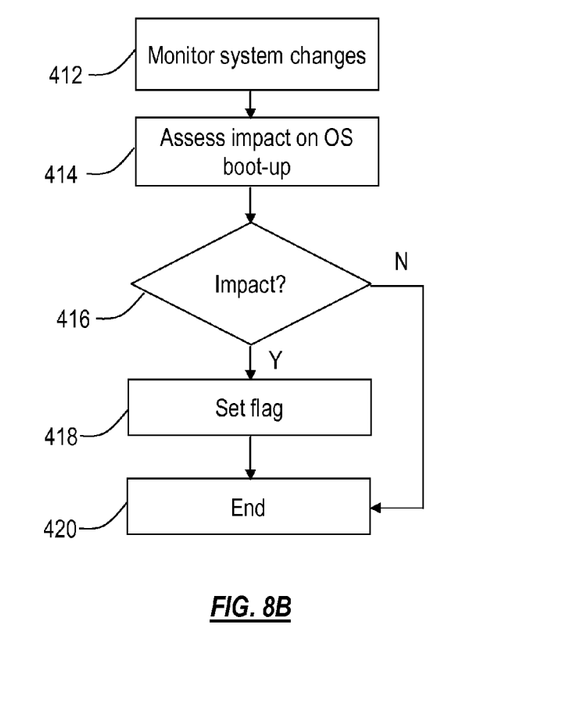

FIGS. 8A and 8B are flow diagrams illustrating exemplary operations performed by security application 250. Referring first to FIG. 8A, at 402 security application 250 receives a routine update, including an update of the malware definitions database. At 404, an assessment is made by security application 250 as to whether the update includes protection against particularly virulent malware such as rootkits or bootkits. According to decision 406, if, as a result of the assessment, it is determined that the update has an impact on protection against such malware, then flag 334 is set in secure buffer 252.

As depicted in FIG. 8B, change detection module 320 monitors for any changes to system settings at 412. This can include examining the event log of the operating system, monitoring for changes to the registry, monitoring for changes to files that are read during system start-up, etc. At 414, an assessment is made as to whether those changes have an impact on the system start-up and, in the affirmative case, based on decition 416, system change flag 336 is set.

Figure 9:
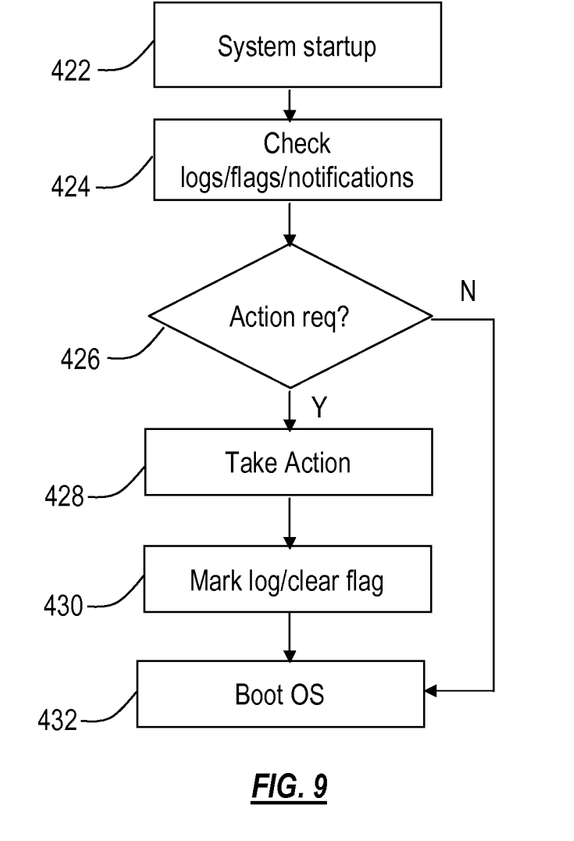
FIG. 9 is a flow diagram illustrating certain operations performed by a pre-OS security agent during system startup according to one embodiment.

FIG. 9 illustrates an exemplary operation by pre-OS security agent 200 according to a related embodiment. At 422, the computer system startup is initiated, and pre-OS environment 116 is executed. Accordingly, pre-OS security agent 200 is initiated. At 424, monitor module 340 checks various monitored indicia, including logs by the operating system and security application 250, flags set by the security application 250, changes to monitored files in the file system, operating system registries, etc. Also, a communication may be established to a security server, such as remote server 260, to pull any notifications that may have issued while the computer system was shut down, or since the last check. At 426, a decision is made, based on operation of decision module 342, whether any action is called for. In the affirmative case, at 428, action execution module 346 takes the prescribed action(s), and at 430 any set flags or other indicia that were fully acted upon, are cleared. After completion of the above sequence, the operating system is booted up at 432.

Figure 10:
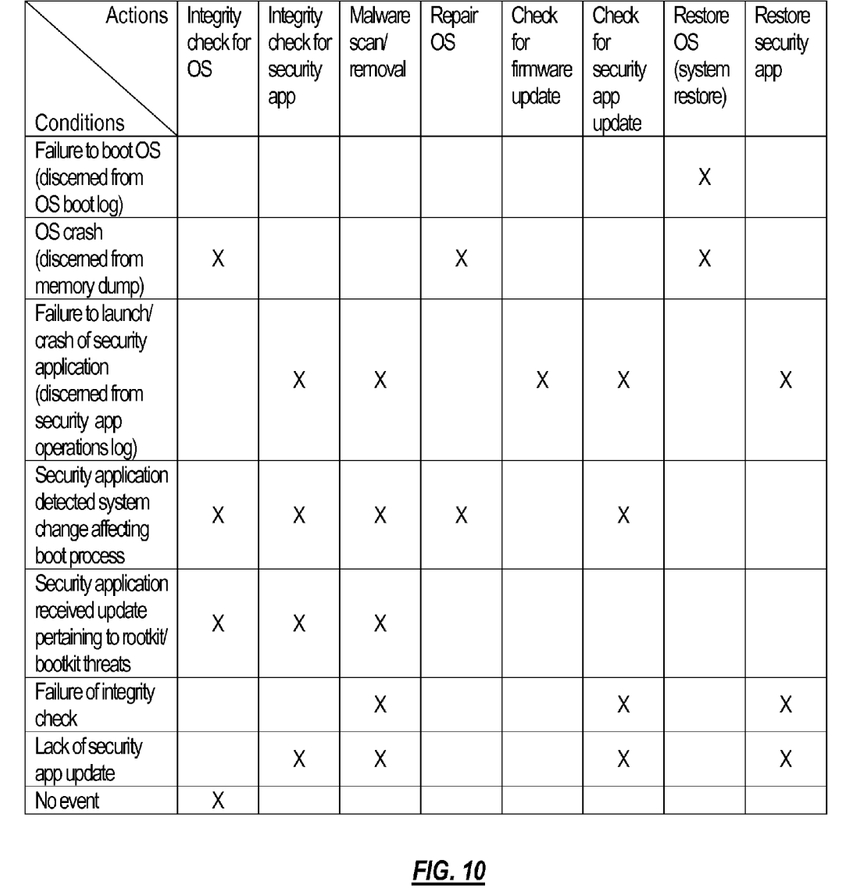
FIG. 10 is a table illustrating various criteria and responsive actions that may be taken by the pre-OS security agent according to various embodiments.

FIG. 10 is a matrix representing an example of decision criteria 344 used by decision module 342 to determine actions to take in response to determined conditions according to one embodiment. This example is by no means a complete or comprehensive set of the decision criteria contemplated. It will be appreciated that the conditions themselves are determined from a variety of data sources, which are analzed and synthesized to arrive at the determination of the state or condition of the computer system. An exemplary set of conditions are presented in rows of the matrix. These include: failure to boot the operating system, which can be discerned, for example, from the operating system's bootup log; a crash of the operating system, discernable from there being a recent memory dump; a failure to launch or a crash of the security application, which can be discerned from applicable logs; a detection of a system change by the security application affecting the boot process; an update received by the security application impacting rootkit/bootkit protection; a failure of integrity checking of the operating system; a lack of security application update over a period of timeduring which the computer system was operational based on event logs and updates were released (indicating the possibility of malware interfering with the update process) and the case where no event of any significance is detected. Columns of the matrix indicate various actions that may be instituted. These include, but are not limited to, integrity checking of the operating system; integrity checking of the security application; a pre-OS malware scan and removal; repair of part of the operating system; a check for firmware update for the pre-OS environment 116 or pre-OS security agent 200; a check for updates of the security application 250; restoration (roll-back) of the operating system (e.g., system restore); and restoration of the security application. The X-marks in the cells of the matrix indicate the actions that may be appropriate in response to corresponding detected conditions. Certain actions may be obviated by performance of other actions; accordingly, actions can be called out in a particular order, generally, from least disruptive to most disruptive to the computer system.

For each action, there may be a variety of parameters that define various constituent tasks that are carried out and the circumstances in which those tasks are required. This logic is defined as part of action execution module 346 in one embodiment. In a related embodiment, such details are maintained remotely, and are read from the remote server when associated action is called for.

In one embodiment, to protect against risks prior to detection of adverse conditions, a system administrator or security service provides notifications, which can be read by pre-OS security agent 200 as described above. In response to those notifications, certain actions can be taken by pre-OS security agent 200 as proactive measures. One such action is downloading an update for the pre-OS security agent 200. Another action is scanning and removal of particular pieces of malware from known locations in the file system prior to loading the operating system. Other actions include updating certain parts of security application 250, such as program blacklists, malware definitions, etc.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C, are not to be invoked unless the specific terms "means for" or "step for" are recited in a claim.

What is claimed is:

1. In a computer system having a set of computing hardware including processing devices, and a data storage device, the computer system further including an operating system (OS) executable on the computing hardware, and a security application executable on the computing hardware and operable dependent on the OS, a method for facilitating system security prior to start-up of the OS, the method comprising:
   initiating, via execution on the computing hardware prior to start-up of the operating system, a pre-OS security agent, the pre-OS security agent being operable independent of the OS;
   performing, via the pre-OS security agent, compact malware scanning and removal, wherein the compact malware scanning is particularized to a predefined set of objects relating to the OS or the security application;
   determining, via the pre-OS security agent, an indication of a state or condition relating to the computer system associated with at least one of: (a) a risk of an inability of the security application to function normally, and (b) a change in the computer system affecting the start-up of the OS, wherein the indication of the state or condition is set by operation of the compact malware scanning;
   based on the indication, determining, via the pre-OS security agent, a set of at least one action to resolve the state or condition;
   executing, via the pre-OS security agent, and only in response to the indication, the set of at least one action.

2. The method of claim 1, further comprising:
   completing execution of the set of at least one action; and
   after the completing of the execution, initiating start-up of the OS.

3. The method of claim 1, wherein obtaining the indication of the state or condition of the computer system includes reading an indicator written by the security application.

4. The method of claim 1, wherein obtaining the indication of the state or condition of the computer system is based on an analysis, by the pre-OS security agent, of an update to the security system having protection against rootkit or bootkit malware.

5. The method of claim 1, wherein obtaining the indication of the state or condition of the computer system is based on an analysis of an event log maintained in a file system of the computer system.

6. The method of claim 1, wherein obtaining the indication of the state or condition of the computer system is based on an analysis, by the pre-OS security agent, of indicia of a failure of the security application to launch properly.

7. The method of claim 1, further comprising:
   obtaining, via the pre-OS security agent, a notification from a remote server; and
   wherein obtaining the indication of the state or condition of the computer system is based on the notification.

8. The method of claim 1, wherein obtaining the indication of the state or condition of the computer system includes reading a secure buffer from the data storage device, the secure buffer being accessible by processes of the security application via a sub-OS driver provided by and the pre-OS security agent.

9. The method of claim 1, wherein obtaining the indication of the state or condition of the computer system includes determining that the security application failed to complete an update.

10. The method of claim 1, wherein executing the set of at least one action includes executing a malware scan of only those objects that are associated with the security application.

11. The method of claim 1, wherein executing the set of at least one action includes manipulating objects stored in a file system of the computer system.

12. The method of claim 1, wherein executing the set of at least one action includes executing a malware scan of only those objects that are associated with a startup sequence of the OS.

13. The method of claim 1, wherein executing the set of at least one action includes restoring a program installed in a file system of the computer system to an earlier version.

14. The method of claim 1, further comprising:
initiating, via the pre-OS security agent, a request for execution of an action by the security application.

15. A system for protecting a computer system that includes computing hardware including processing devices, a data storage device, and a network interface device, the computer system further including an operating system (OS) executable on the computing hardware, and a security application executable on the computing hardware and operable dependent on the OS, the system for protecting the computer system comprising:
a set of instructions executable by the computing hardware and stored in a non-transitory storage medium that, when executed, cause the computing hardware to implement a pre-OS security agent operable independent of the OS, the pre-OS security agent including:
a communication module configured to access a remote computer system via the network interface device;
a lightweight antivirus module configured to perform malware scanning and removal, wherein the malware scanning is particularized to a predefined set of objects relating to the OS or the security application;
an interface module configured to facilitate exchange of data between the pre-OS security agent, and the security application and file system of the computer system; and
an action coordinator module configured to detect a first indication of a state or condition relating to the computer system associated with at least one of: (a) a risk of an inability of the security application to function normally, and (b) a change in the computer system affecting the start-up of the OS, wherein the first indication of the state or condition is set by operation of the lightweight antivirus module;
the action coordinator module further configured to determine and execute a set of at least one action to resolve the state or condition in response to the first indication.

16. The system of claim 15, wherein the action coordinator module is configured to receive, via the network interface device, a notification from a remote server, the notification relating to malware threats affecting startup processes of computer systems, and the notification further constituting the first indication is based in part on the notification.

17. The system of claim 15, wherein the action coordinator module is further configured to obtain, via the interface module, a flag set by the security application, the first indication being based at least in part on the flag.

18. The system of claim 15, wherein the pre-OS security agent further includes an update module configured to obtain, from a remote service, an update containing bootkit/rootkit protection components.

19. The system of claim 15, wherein the pre-OS security agent further includes a restoration module configured to restore a previous version of at least one of: (i) the security application; and (ii) a component of the OS.

20. The system of claim 15, wherein the interface module is configured to provide access to a secure buffer accessible to the security application but inaccessible to any other application installed in the computer system, the secure buffer being implemented on a non-volatile memory device on which the pre-OS security agent is stored.

21. The system of claim 15, wherein the action coordinator module is configured to communicate, via the interface module, a request for execution of an action by the security application.

22. The system of claim 15, wherein the pre-OS security agent includes an update module configured to obtain, from a remote service, a narrowly-tailored update particularized to predefined critical matters relating to the OS or the security application.

23. The system of claim 15, wherein the interface module is configured to provide access to a secure buffer accessible to the security application but inaccessible to any other application installed in the computer system, the secure buffer being accessible to the security application only via a sub-OS driver provided as part of the pre-OS security agent.

* * * * *